April 23, 1929.  J. T. HENRY  1,710,578
ICE CREAM FREEZER
Filed March 22, 1927   5 Sheets-Sheet 3

Inventor;-
Joseph T. Henry,
by his Attorneys
Howson & Howson

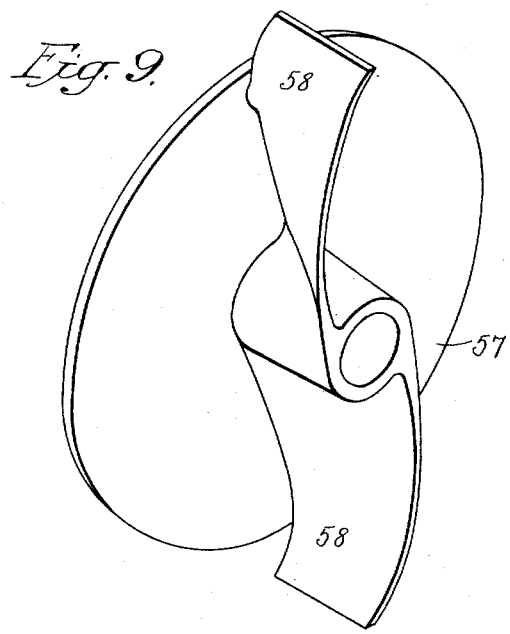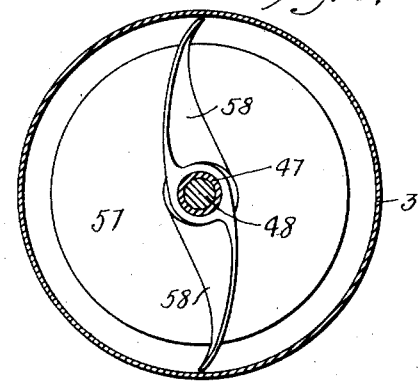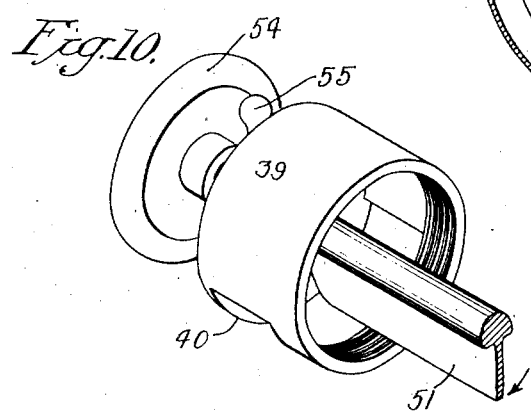

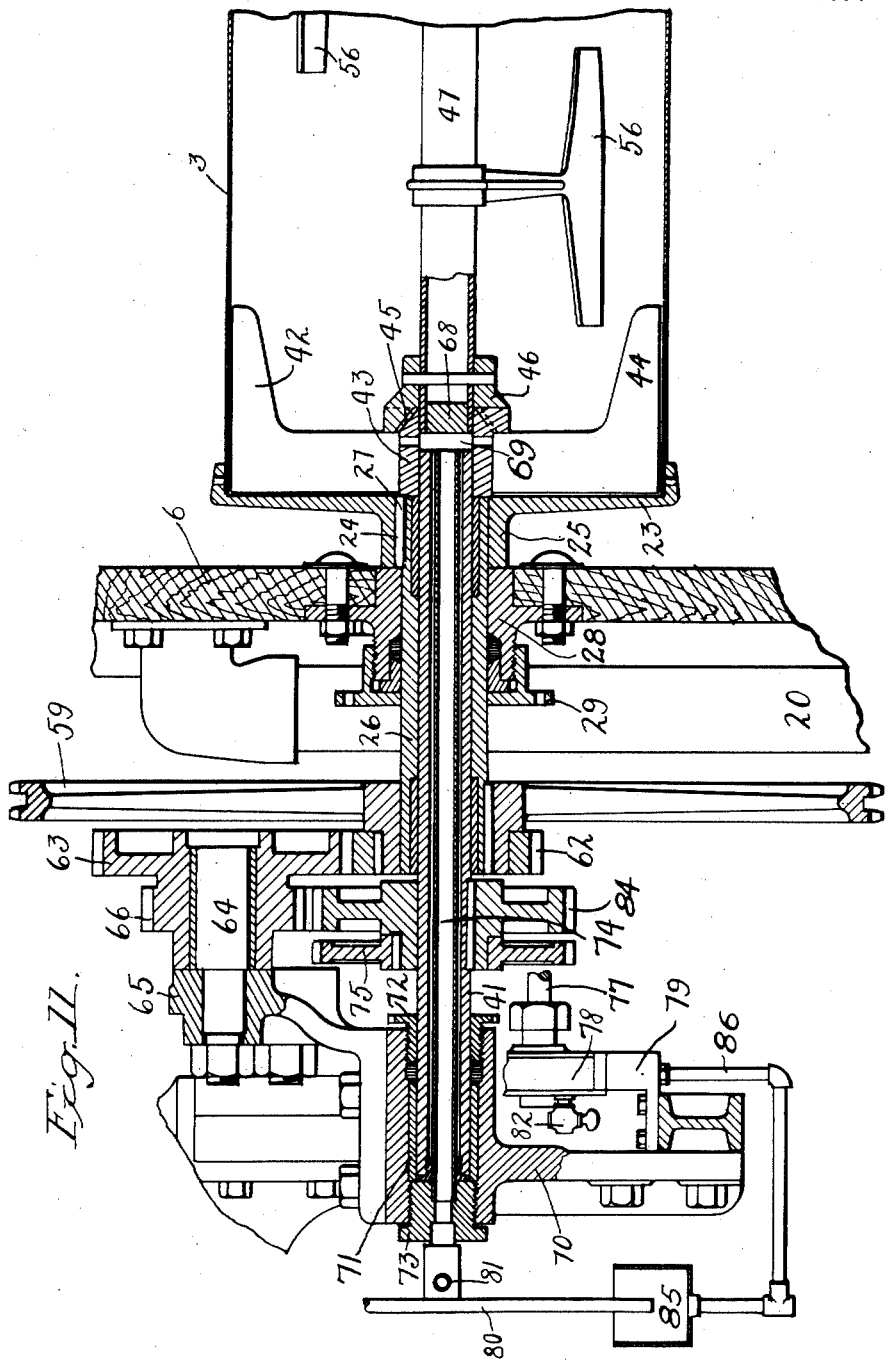

Patented Apr. 23, 1929.

1,710,578

UNITED STATES PATENT OFFICE.

JOSEPH T. HENRY, OF YORK, PENNSYLVANIA.

ICE-CREAM FREEZER.

Application filed March 22, 1927. Serial No. 177,404.

This invention relates to the freezing of ice cream, and the prime object is to provide a machine of novel and improved construction affording advantages in manufacture and high efficiency in operation.

Another object of the invention is to provide a continuous ice cream freezer having a novel form of valve mechanism for controlling the discharge of the frozen ice cream from the freezer.

Another object is to provide an ice cream freezer with means for whipping the cream into the lightest possible foam so that such cream will be quickly frozen into a velvety product.

With these and other objects and applications in mind, my invention further consists in the details of construction and operation and arrangement of parts hereinafter set forth and claimed and illustrated in the accompanying drawings, wherein:—

Figure 2:
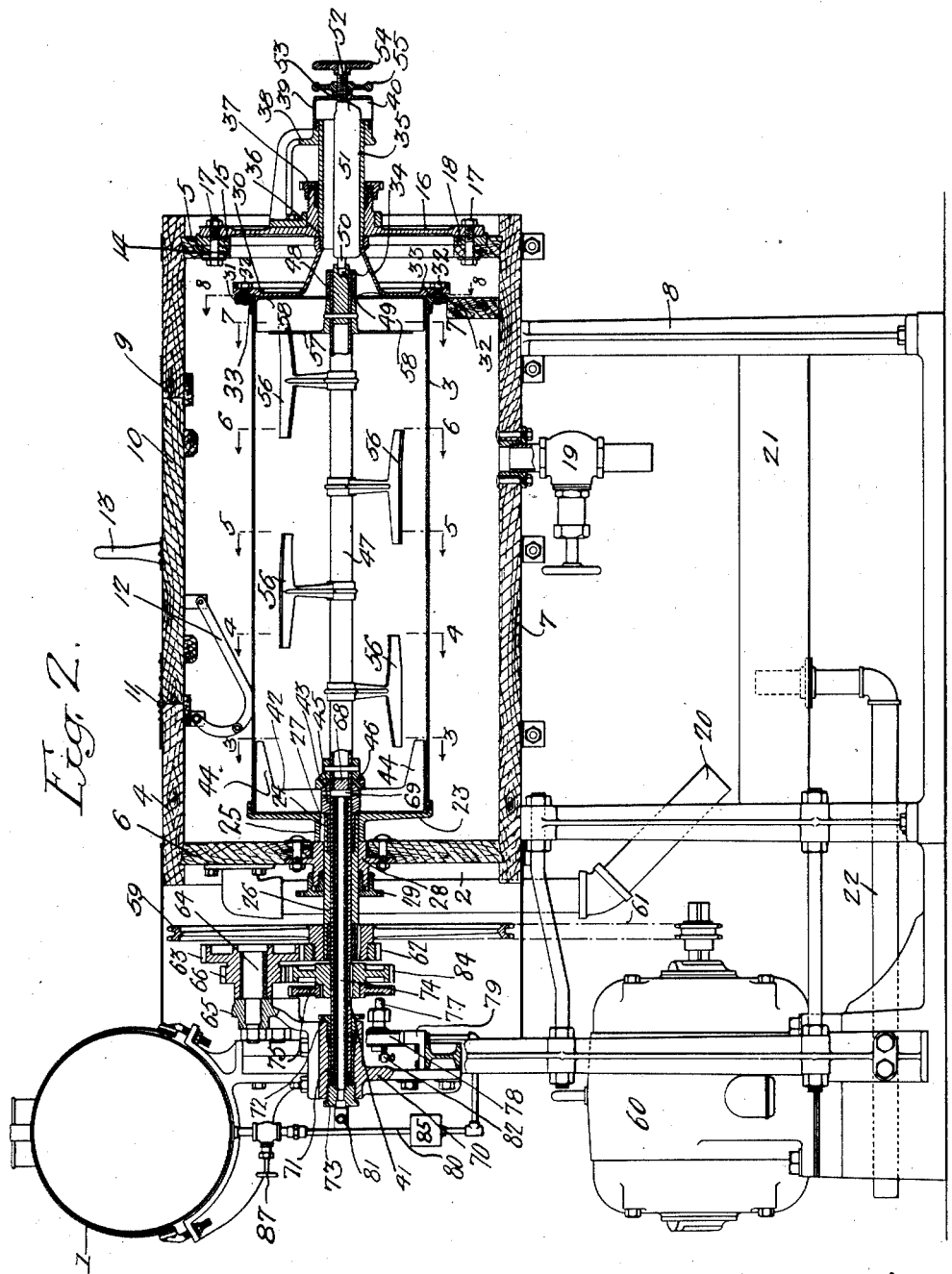
Fig. 2 is a vertical longitudinal section as seen from the line 2—2, of Fig. 1.

Figs. 4 to 7, inclusive, are respectively transverse sections taken on the lines 4—4, 5—5, 6—6, and 7—7 of Fig. 2, illustrating details of the propellers in the freezer can;

Fig. 8 is a transverse section taken on the line 8—8 of Fig. 2, illustrating detail of the discharge propeller;

Fig. 9 is a detail perspective view of the discharge propeller;

Fig. 10 is a detail perspective view of the discharge valve;

Fig. 11 is an enlarged vertical longitudinal section of driving mechanism; and

Figs. 12 and 13 are detail views of the pump.

With reference to the drawings, the machine comprises a unitary structure that can be moved from place to place without being disassembled and re-assembled. Included in the machine is a supply tank 1 for containing a suitable quantity of the raw cream mixture, and a freezing chamber 2, in which is mounted a freezer can 3. Means are provided for delivering the raw material to the freezer can and for comingling a large quantity of air with such raw material as it enters the freezer can; means are also provided for whipping the raw material in the freezer can into a light foamy substance and for simultaneously forcing the same forwardly of the can as it is chilled and frozen; means are also provided for controlling the amount of material discharged from the can so that a continuous frozen product of uniform consistency will be made; and means are provided for driving the several parts of the machine from a single source of power.

The freezing chamber 2 is preferably in the form of a rectangular wooden box having a top 4, front and rear end walls 5 and 6, respectively, and a bottom 7. The box is horizontally mounted in a suitable skeleton frame 8. The top 4 of the box is provided with an opening 9 that is closed by a lid 10. The lid may be pivotally connected to the top by a hinge 11. A compound pivoted arm 12, connected to the underside of the lid and to the underside of the top of the box near the hinge 11 may be used to provide a stop for limiting the outward swinging movement of the lid. The lid is also provided with a handle 13.

The rear end wall 6 of the box is made integral with the top, bottom and sides, but, in order to permit access to the interior of the freezer can 3, the front end 5 of the box is provided with a relatively large opening 14. This opening is surrounded by a ring 15 which can be, if so desired, countersunk in the wood. A removable head 16, preferably in the form of a metal plate that is seated against the ring 15, serves as means for closing the end of the box. The head 16 is fastened to the ring 15 by bolts 17, and a gasket 18 is interposed between the ring and head for sealing the joint therebetween.

The bottom 7 of the box is fitted with a valve 19 through which the brine used for freezing the ice cream may be withdrawn, while the end 6 of the box is provided with an overflow pipe 20. A pan 21, into which the liquid from the bottom of the box, or the overflow pipe 20 is adapted to flow, is mounted in the frame beneath the box. A pipe 22, having one end projecting into the pan, and its opposite end extending away from the machine, serves as a drain for carrying off the surplus liquid delivered to the pan.

The freezer can 3 comprises a cylindrical vessel formed from sheet metal. It is horizontally disposed within the freezing chamber 2, being supported by the two ends of the box. This can is revolvably mounted in such a manner that the raw cream can be delivered through one end thereof from the supply tank 1 and be discharged through the opposite end thereof after it has been frozen.

The inner end of the can has tightly fixed thereto a head 23 having a central aperture 24 surrounded by a flange 25 that projects outwardly a suitable distance from the head of the can and abuts against the end 6 of the box. One end of a tubular drive shaft 26 is inserted into the aperture 24 and is connected to the head of the can by means of a key 27. The drive shaft passes through a bearing 28, mounted in the end 6 of the box. The bearing has a packing nut 29 threaded thereto, so as to provide a water tight joint.

The outer end of the can is provided with a removable closure 30. The rim of the can has sweated thereon a flanged ring 31, and the closure is secured to the flange of the ring by means of bolts 32, a gasket 33 being interposed between the ring and closure for sealing the joint therebetween. The closure 30 is provided with a central funnel-shaped opening 34 that projects outwardly from the freezer can and terminates adjacent to the head 16.

A sleeve 35 that is inserted through a bearing 36 mounted in the head 16, is threaded into the end of the portion 34 of the closure 30. The bearing 36 has a packing nut 37 threaded thereto, so as to provide a water tight joint. The sleeve 35 functions as a discharge tube through which the frozen cream flows, and its outer end is supported by a bracket 38 fixed to the head 16 and extending outwardly therefrom.

Beyond the portion of the sleeve engaged by the bracket 38 is a cap 39. This cap is threaded on to the end of the sleeve and, as clearly shown by Fig. 10, such cap has a slot 40 cut into its side. The slot 40 preferably extends about halfway around the circumference of the cap. When the cap is screwed on to the end of the sleeve the slot is so disposed that a discharge opening is formed in the bottom of the end of the discharge tube.

By the construction just described, the drive shaft 26 and the sleeve 35 constitute trunnions for supporting the can 3 inside the box so that considerable space will be provided around the exterior of the can for the cracked ice or other material used for the freezing medium.

Mounted inside of the drive shaft 26 and projecting from each end thereof is another drive shaft 41. One end of the shaft 41 projects into the can a suitable distance and has keyed thereon a paddle 42.

Figure 3:
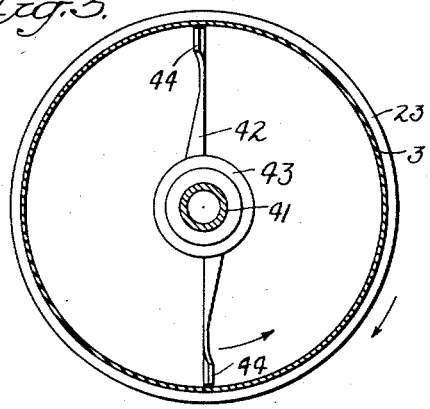
Fig. 3 is a vertical transverse section taken on the line 3—3 of Fig. 2, showing detail of the paddle at the inlet end of the freezer can.

The paddle is provided with a hub 43 and two oppositely projecting blades. The blades are L-shaped in form, and each have relatively long limbs 44 that are spaced a slight distance from the side of the can and project forwardly towards the discharge end thereof. These limbs are, as shown by Fig. 3, twisted slightly so that when the machine is operated they will function as means for initially propelling the cream mixture forwardly. The design of the paddle should be such that it will thoroughly mix and whip the raw material and the air together as they are injected into the can.

The inner face of the hub 43 is provided with jaws 45 for engaging correspondingly formed jaws 46 on the end of a propeller shaft 47 that is horizontally disposed inside the freezer can and is coextensive therewith. The other end of the shaft 47 projects into the portion 34 of the closure 30 and has fitted therein a plug 48. The plug has a recess 49 that serves as a bearing for a trunnion 50 projecting from the inner end of the discharge regulator 51.

The regulator 51 is disposed longitudinally of the sleeve 35 and its outer end is provided with a threaded shank 52 that extends through an opening 53 in the cap 39. The end of the shank 52 is provided with a hand wheel 54, while mounted on the shank between the hand wheel and the cap is a lock nut 55.

Figure 4:
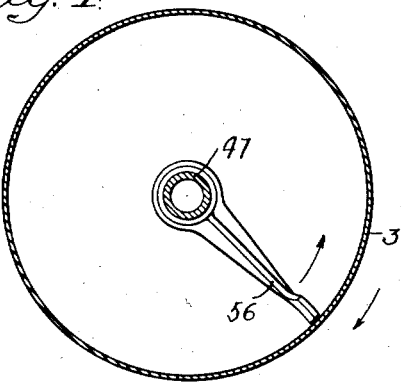
Figure 5:
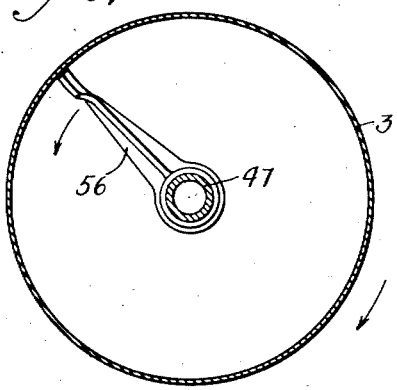
Figure 6:
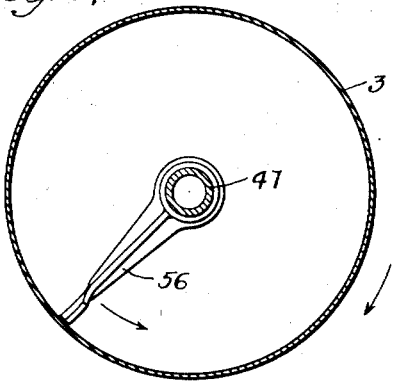
Figure 7:
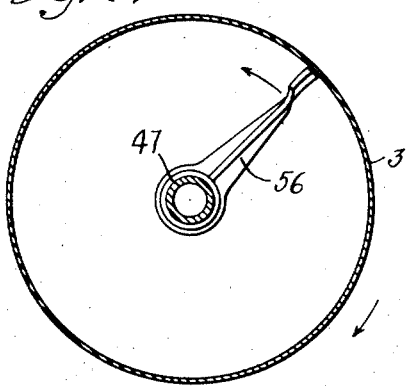

Fixed at intervals along the length of the shaft 47 and disposed angularly with relation to each other, are propellers 56. These propellers are each formed with suitable shanks, the end of which are flattened to provide relatively long thin blades. The edges of the blades are arranged parallel to the interior of the can 3 and are spaced slightly therefrom. As shown by Fig. 4, the length of each blade and the disposition of the propellers is such that the tips of the adjacent blades overlie each other. When the cream material begins to solidify the churning action produced by the rotating blades tends to twist the mass and this action, taken in connection with the propelling action produced by the paddle 42 forces the mass forwardly towards the outer end of the can.

Mounted on the end of the shaft 47, and positioned near the opening 34, is a discharge propeller 57. This propeller includes a disk portion having a diameter less than the diameter of the can and arranged transversely of the can, and a pair of blades 58 that are disposed substantially at right angles to the disk portion. If so desired the propeller can be made from a single casting, with one edge of the blades integral with the face of the disk portion. As shown by Figs. 2, 8 and 9, the tips of the blades project beyond the periphery of the disk portion of the propeller but they terminate a slight distance from the side of the can. These blades are both twisted, so that when the frozen cream is forced through the gap between the periphery of disk portion and the side of the can, such cream will be directed towards the discharge tube provided by the sleeve 35.

The freezer can 3 is adapted to be rotated in a clockwise direction, while the propeller blades disposed within the can are rotated in a reverse, or counter-clockwise direction. Therefore, when the frozen cream is forced out of the can by the propeller 57 it engages one side of the regulator 51. If the regulator is vertically disposed in the sleeve, as is illustrated then the cream will flow through only a portion of the opening 40 in the cap 39. Should a larger or smaller opening be necessary in order to increase or diminish the amount of cream being discharged, then the lock nut 55 may be unscrewed and the hand wheel 54 turned to change the position of the regulator 51. If the regulator is moved in the direction indicated by the arrow (Fig. 10) then the discharge opening will be increased while a movement in the opposite direction would decrease the size of the discharge opening.

The drive shaft 26 has a large sprocket 59 fixed to its outer end. This sprocket is driven from a motor 60, mounted in the bottom of the frame 8, by a chain 61 (indicated by broken lines). Keyed to the hub of the sprocket 59 is a gear 62 that meshes with an idler gear 63 mounted on the inner end of a stub shaft 64. The shaft 64 is carried by a bracket 65 attached to the portion of the skeleton frame 8 above the motor 60.

The idler gear 63 has integrally formed therewith another gear 66 of lesser diameter that meshes with a gear 67 mounted on stud shaft 83 that is also carried by the bracket 65. The gear 67 meshes with a gear 84 keyed to the propeller drive shaft 41. The inner end of the shaft 41 is closed by means of a plug 68, and a transverse opening 69 is formed in the shaft adjacent to the plug, said opening also extending through the hub of the paddle 42.

The outer end of the shaft 41 is carried by a bracket 70 fixed to the frame. Preferably the bracket 70 is provided with a longitudinal bore 71 and threaded into each end of such bore are nuts 72 and 73, the nut 72 being in the nature of a packing nut, while the nut 73 is in the nature of a bushing that closes the outer end of the shaft 41.

Disposed within the shaft 41 is a tube 74 through which the supply of cream is delivered to the interior of the freezer can. The inner end of the tube terminates adjacent to the opening 69, while the outer end of the tube is threaded into the bushing 73.

Fixed to the gear 84 is another gear 75 that meshes with a gear 76 on the end of a shaft 77 carried by a pump 78. The pump is secured to the frame by a bracket 79.

Depending from the supply tank 1 is a pipe 80 that discharges the mixture to be frozen into a reservoir 85.

The reservoir may be mounted on the upper end of a pipe 86 extending to the pump 78.

Another pipe line 81 connects the pump to the bushing 73.

The purpose of the reservoir 85 is to enable the operator to observe the quantity of mixture being delivered to the freezer from the supply tank.

A gate valve 87 may be mounted in the pipe 80 adjacent to the supply tank 1 to control the discharge of material therefrom.

In machines of the character herein disclosed, a large quantity of air is mixed with the cream. Therefore, the pump is provided with an air inlet controlled by a valve 82. Any suitable type of pump may be used. In the present instance I have shown a type of gear pump which I have found suitable for the purpose. The liquid from the supply tank 1 flows by gravity to the pump, and from this it is forced through the tube 74 into the freezer can.

Figure 1:
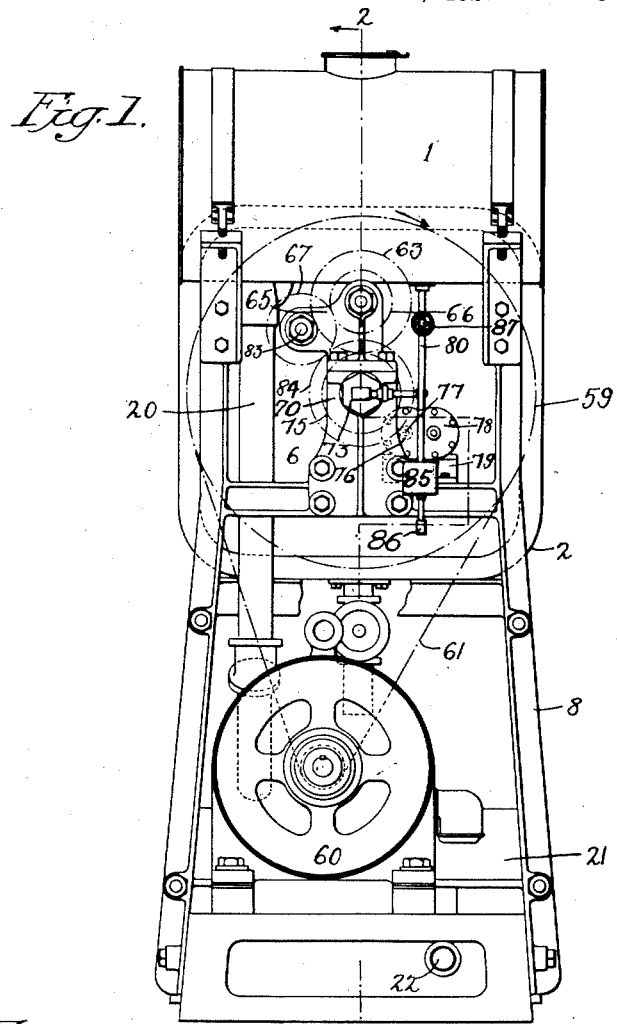
Figure 1 is an end view of a machine for freezing ice cream constructed according to my invention, parts being omitted for sake of clearness.

As shown by the arrow, Fig. 1, the disposition of the gearing on the ends of the shafts 26 and 41 are such that the shaft 26 will be rotated in a clockwise direction while the shaft 41 will be rotated in a counter clock-wise direction. This in turn, will rotate the propeller shaft 47 opposite to the direction in which the can 3 is rotated, and therefore, the cream on passing into the can will be beaten to a foamy consistency and then quickly frozen.

Since certain changes may be made in the above construction and different embodiments of the invention could be made without departing from the scope thereof, it is intended that all matter contained in the above description or shown in the accompanying drawings shall be interpreted as illustrative and not in a limiting sense.

It is also to be understood that the following claims are intended to cover all the generic and specific features of the invention herein described, and all statements of the scope of the invention which, as a matter of language might be said to fall therebetween.

I claim:

1. An ice cream freezer comprising a revolvable freezer can having an inlet in one end and an outlet in its opposite end, a shaft longitudinally disposed in the said can, means mounted inside of the can adjacent to the inlet and extending substantially contiguous therewith and with a portion of said can, and rotated in a direction opposite to the said can for propelling the ice cream towards the outlet, and a plurality of T-shaped agitators mounted on said shaft between the said inlet and outlet.

2. An ice cream freezer comprising a revolvable freezer can having an inlet in one end and an outlet in its opposite end, a shaft longitudinally disposed in the said can, means mounted inside of the can adjacent to the inlet and extending substantially contiguous therewith and with a portion of said can, and rotated in a direction opposite to the said can for propelling the ice cream towards the outlet, the said propelling means including a pair of L-shaped blades, the extremities of which project towards the outlet of the said can, and a plurality of T-shaped agitators mounted on said shaft between the said inlet and the said outlet, the adjoining tips of the blades overlying each other.

3. An ice cream freezer comprising a revolvable freezer can having a discharge tube in one end thereof and an inlet in the opposite end thereof, and means mounted inside of the can adjacent to said inlet and rotated in a direction opposite to the said can for propelling the ice cream through the said discharge tube, said means including a pair of L-shaped blades, one limb of which is disposed substantially contiguous to the side wall of the can and project to a line substantially contiguous to the said discharge tube.

4. A dasher for use in ice cream freezer cans including a pair of L-shaped blades, one limb of each blade being disposed substantially contiguous to the end of the can and the other limb of each blade projecting forwardly along the side wall of the can, extending to a line just short thereof, a shaft longitudinally disposed in the can, and a plurality of T-shaped blades mounted on said shaft, the horizontal arms of said blades being disposed parallel to the side wall of the can.

5. An ice cream freezer comprising a revolvable freezer can having an inlet in one end and a discharge tube in its opposite end, a disc rotatable in a direction opposite to the said can and disposed adjacent to the discharge end for partially closing the end of the can, and a pair of blades on said disc, said blades being disposed at right angles thereto and so formed as to force the ice cream through the tube.

6. An ice cream freezer comprising a revolvable freezer can having an inlet in one end and a discharge tube in its opposite end, said tube being closed by a slotted cap, a blade disposed longitudinally of the tube and bisecting the slot in the cap for regulating the quantity of ice cream discharged through the slot, and means for shifting the angular position of the said blade with respect to the said slot.

7. An ice cream freezer comprising a revolvable freezer can having an inlet in one end and an outlet in its opposite end, and a disk rotatable in a direction opposite to the said can and disposed adjacent to the said outlet for partially closing the end of the can, said disk having a pair of blades disposed at right angles to the face thereof, and projecting beyond the periphery thereof for forcing the ice cream through the said outlet.

8. An ice cream freezer comprising a revolvable freezer can having an inlet in one end and an outlet in its opposite end, and having a shaft longitudinally disposed therein, a disk mounted on the shaft near one end of the can, said disk having a diameter less than the diameter of the can, a pair of blades on said disk, said blades being disposed at right angles to the disk and projecting beyond the periphery thereof.

9. In an ice cream freezer comprising a revolvable freezer can having an inlet in one end and an outlet in its oposite end, a shaft extending longitudinally through said can, means mounted on said shaft to propel the ice cream towards the outlet, and means rotatable in a direction opposite to said can and disposed adjacent the outlet for partially closing the end of the can, said last-mentioned means having means disposed at right angles to its face, for forcing the ice cream through the said outlet.

10. In a revolvable ice cream freezer having a freezer can and a closure head therefor, an outlet in said head, means for regulating the opening in said outlet comprising a rectangular bar arranged upstanding in said outlet, and a hand wheel for swinging said bar to adjust the amount of said opening.

11. In a revolvable ice cream freezer, a freezer can, a closure head therefor, a sleeve in said head, a cap on said sleeve, having a peripherally-extending slot therein, functioning as an outlet orifice for ice cream coming through said sleeve, and a regulator adjusting the effective area of said slot, said regulator comprising a radially extending bar, arranged edge on, and extending longitudinally of said sleeve, and having means for swinging it angularly.

JOSEPH T. HENRY.